(12) United States Patent
Kawasaki

(10) Patent No.: US 6,959,887 B2
(45) Date of Patent: Nov. 1, 2005

(54) SPOOL FOR DUAL-BEARING REEL (75) Inventor: Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 10/671,634

(22) Filed: Sep. 29, 2003

(65) Prior Publication Data
US 2004/0079822 A1 Apr. 29, 2004

(30) Foreign Application Priority Data
Oct. 25, 2002 (JP) ........................................ 2002-311548

(51) Int. Cl.⁷ ............................................. A01K 89/02
(52) U.S. Cl. ..................... 242/322; 242/610.4; 242/614
(58) Field of Search ............................. 242/322, 610.4, 242/614, 610.5, 610.6

(56) References Cited

U.S. PATENT DOCUMENTS

| | | | | |
|---|---|---|---|---|
| 2,657,876 A | * | 11/1953 | Bieber ...................... 242/597.7 |
| 4,451,012 A | * | 5/1984 | Puryear et al. ............. 242/319 |
| 5,415,362 A | * | 5/1995 | Lorenzo ................... 242/608.6 |
| 5,697,567 A | * | 12/1997 | Sonenvald ................... 242/322 |
| 5,755,398 A | * | 5/1998 | Thompson et al. ......... 242/614 |
| 5,785,266 A | * | 7/1998 | Bowersox ................... 242/323 |
| 6,679,445 B2 | * | 1/2004 | Morise et al. ............... 242/322 |
| 2002/0162910 A1 | * | 11/2002 | Hitomi ........................ 242/322 |
| 2002/0170997 A1 | * | 11/2002 | Furomoto ................... 242/246 |

FOREIGN PATENT DOCUMENTS

| | | | | |
|---|---|---|---|---|
| EP | 1108356 A | | 6/2001 | |
| JP | 7-303439 | * | 7/1995 | ................. 242/247 |
| JP | 10-155402 A | | 6/1998 | |
| JP | 2000-041548 A | | 2/2000 | |

* cited by examiner

Primary Examiner—Emmanuel Marcelo
(74) Attorney, Agent, or Firm—Shinjyu Global IP Counselors, LLP (57) ABSTRACT A spool for a dual-bearing reel that allows accurate casting to be performed is provided. A spool includes a tubular bobbin trunk, and flange portions that project radially outward on both sides of the bobbin trunk. The flange portions include inner flange portions and outer flange portions. The inner flange portions are formed on both ends of the bobbin trunk, project radially outward, and are integrally formed with the bobbin trunk. The outer flange portions are formed on the outer peripheral surfaces of the inner flange portions, and radially project outward. The outer flange portions are outsert formed on the inner flange portions. The bobbin trunk is made from an aluminum alloy, and the outer flange portions are made from a magnesium alloy.

17 Claims, 12 Drawing Sheets

SPOOL FOR DUAL-BEARING REEL

BACKGROUND OF THE INVENTION

1. Field of the Invention

The present invention relates to a spool. More specifically, the present invention relates to a spool for a dual-bearing reel.

2. Background Information

Generally, a dual-bearing reel is made of a reel unit having a handle, and a spool that is rotatively mounted to the reel unit. The spool includes a bobbin trunk for winding fishing line around the outer periphery thereof and flange portions provided at both ends of the bobbin trunk. The bobbin trunk includes a cylindrical portion around which fishing line is wound along the outer periphery thereof, and a boss portion that is formed on the inner peripheral side of the cylindrical portion and mounted to a spool shaft. The flange portions have diameters that are larger than that of the bobbin trunk. Each of the flange portions projects outward in the radial direction at both ends of the bobbin trunk. In this type of spool, it is well known in the art to form the boss portion from a synthetic resin or the like in order to reduce the weight thereof, and form the flange portions from sheet metal in order to increase the strength thereof as shown in Japanese Patent Application Publication No. 2000-41548.

In the aforementioned conventional spool, the overall weight of the spool can be reduced because the boss portion, which makes up most of the weight of the spool, is formed from a synthetic resin. In addition, the strength of the flange portions can be increased because they are formed from sheet metal.

However, although the overall weight of this type of spool can be reduced, the weight of the outer peripheral sides of the flange portions cannot be reduced because they easily assert an influence on the inertial force of the spool when it rotates. Thus, when the weight of the outer peripheral sides of the flange portions is increased, there is a possibility that one cannot accurately cast a light tackle because the initial rotational speed of the spool will be slow.

In view of the above, there exists a need for a spool for a dual-bearing reel that overcomes the above mentioned problems in the prior art. This invention addresses this need in the prior art as well as other needs, which will become apparent to those skilled in the art from this disclosure.

SUMMARY OF THE INVENTION

An object of the present invention is to provide a spool for a dual-bearing reel that allows accurate casting to be performed.

A spool for a dual-bearing reel according to a first aspect of the present invention is provided on a spool shaft that is supported by a reel unit and rotates by rotation of a handle, which is mounted to the reel unit. The spool includes a tubular bobbin trunk and flange portions. The tubular bobbin trunk is adapted to be mounted to the spool shaft. A fishing line is wound around the outer periphery of the tubular bobbin trunk. The flange portions have an inner flange portion projecting radially outward from one of the ends of the bobbin trunk, and an outer flange portion that projecting radially outward from an outer periphery of the inner flange portion. The outer flange portion has a density that is lower than that of the bobbin trunk.

As stated, in this spool, the flange portions include an inner flange portion, and an outer flange portion, which is provided on the outer periphery of the inner flange portion and has a density that is lower than that of the bobbin trunk. Here, the outer flange portion easily asserts an influence on the inertial force of the spool when it rotates, because the density thereof is lower than that of the bobbin trunk, and thus the weight of the outer flange portion can be reduced. Since the weight of the outer flange portion is reduced, the initial rotational speed of the spool will be quicker and a light tackle can be accurately cast.

A spool according to a second aspect of the present invention is the spool of the first aspect, in which the outer flange portion is made from a magnesium alloy. In this situation, the weight of the outer flange portions can be reduced by forming the same from a magnesium alloy whose density is lower than, for example, that of aluminum.

A spool according to a third aspect of the present invention is the spool of the first aspect, in which the outer flange portion is made from a synthetic resin. In this situation, the weight of the outer flange portions can be reduced by utilizing the synthetic resin.

A spool according to a fourth aspect of the present invention is the spool of any of the first to third aspects, in which the bobbin trunk is made from an aluminum alloy. In this situation, the weight of the entire spool can be reduced by forming the bobbin trunk from a comparatively lightweight aluminum alloy.

A spool according to a fifth aspect of the present invention is the spool of any of the first to fourth aspects, in which the bobbin trunk is integrally formed with the inner flange portions, and the outer flange portion is provided on outer peripheral surfaces of the inner flange portion. In this situation, the outer flange portion and the inner flange portion are smoothly and continuously joined with each other, and thus improving the design.

A spool according to a sixth aspect of the present invention is the spool of the fifth aspect, in which the outer flange portion is outsert formed on the inner flange portion. In this situation, the formation of the outer flange portions is simplified.

A spool according to a seventh aspect of the present invention is the spool according to any of the first to fourth aspects, in which the bobbin trunk is made of a trunk inner peripheral portion and a trunk outer peripheral portion. An inner periphery of the trunk inner peripheral portion is mounted to the spool shaft and is integrally formed with the inner flange portion. The trunk outer peripheral portion is formed integrally with the outer flange portion, and extends along the inner flange portion. Fishing line is wound around an outer periphery of the trunk outer peripheral portion. In this situation, the strength of the spool can be increased by way of the trunk inner peripheral portion and the trunk outer peripheral portion.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

<Overall Structure>

Figure 1:
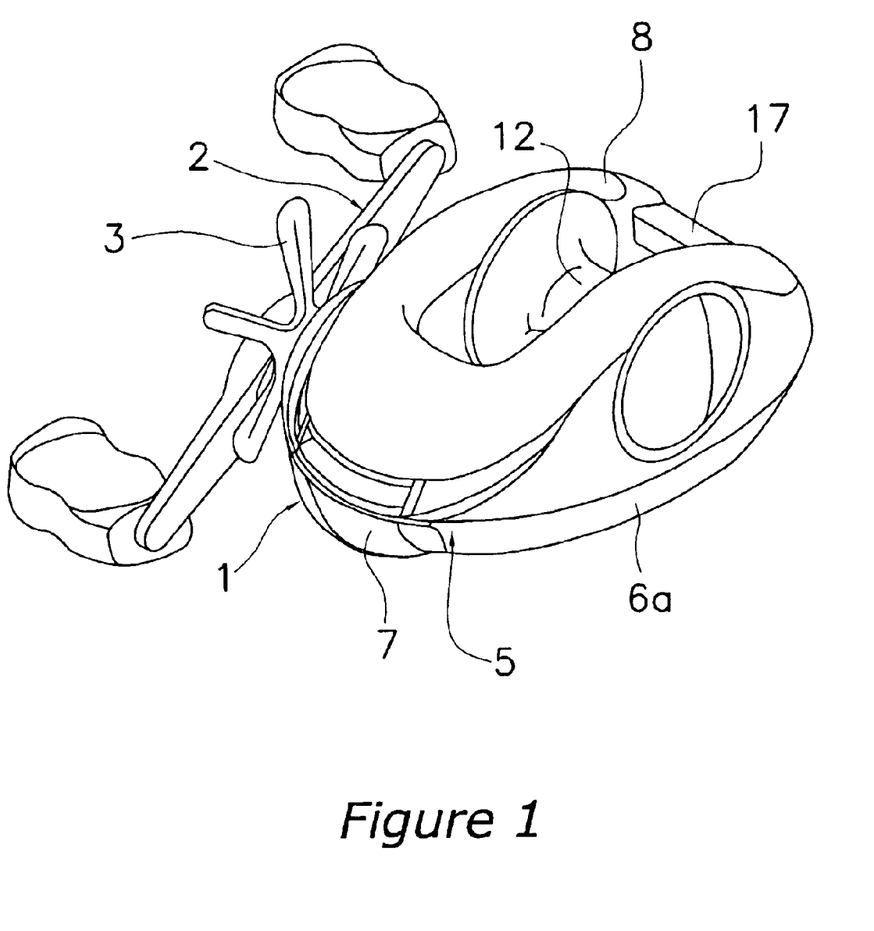
FIG. 1 is a perspective view of a dual-bearing reel in accordance with a preferred embodiment of the present invention.

As shown in FIG. 1, a dual bearing reel according to a preferred embodiment of the present invention is a low profile-type reel and is used to cast bait. This reel includes a reel unit 1, a handle 2 rotatably attached to the reel unit 1, a spool shaft 16 rotatably supported by the reel unit 1, and a spool 12 disposed in the reel unit 1 and configured to be rotated by the handle 2. The dual bearing reel of the present invention also has a star drag 3 to adjust drag that is preferably disposed on the same side of the reel unit 1 as the handle 2.

Figure 2:
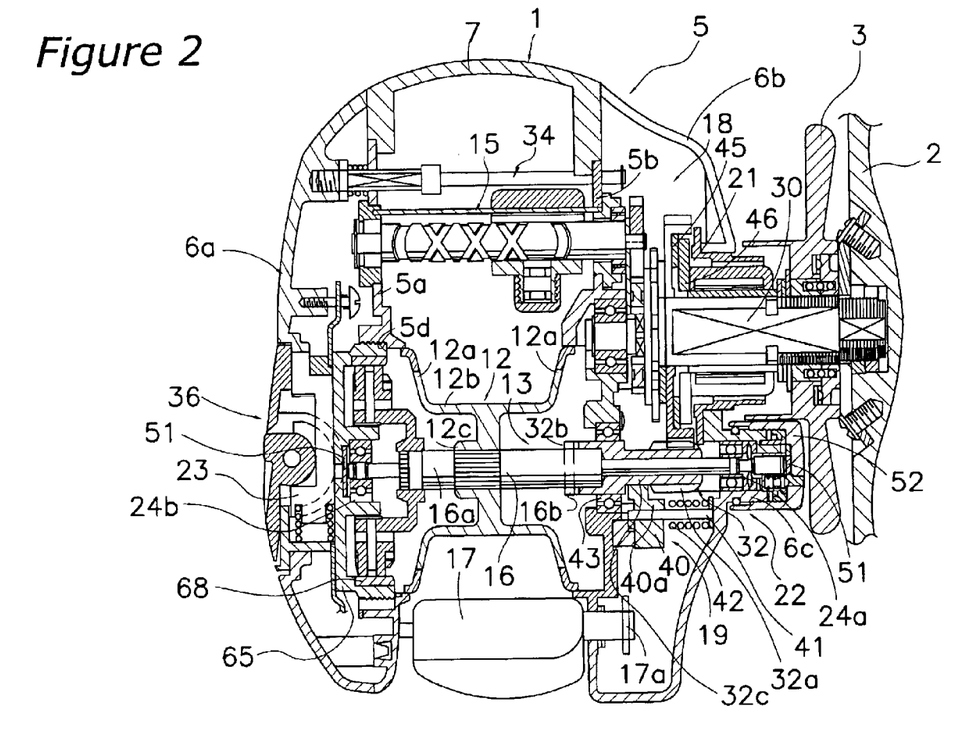
FIG. 2 is a cross-sectional plan view of the dual-bearing reel.

As shown in FIG. 2, the reel unit 1 has a frame 5, and a first side cover 6a and a second side cover 6b that are mounted to both sides of the frame 5. As shown in FIG. 1 and FIG. 2, the reel unit 1 also has a front cover 7 that covers the front of the reel unit 1 and a thumb rest 8 that covers the upper portion of the reel unit 1. The spool 12, which is provided to wind fishing line, is rotatively and removably mounted in the interior of the reel unit 1. The frame 5 includes a pair of side plates 5a and 5b disposed opposite to each other at a predetermined spacing, and a plurality of connecting portions (not shown in the figures) that links the side plates 5a and 5b.

Figure 3:
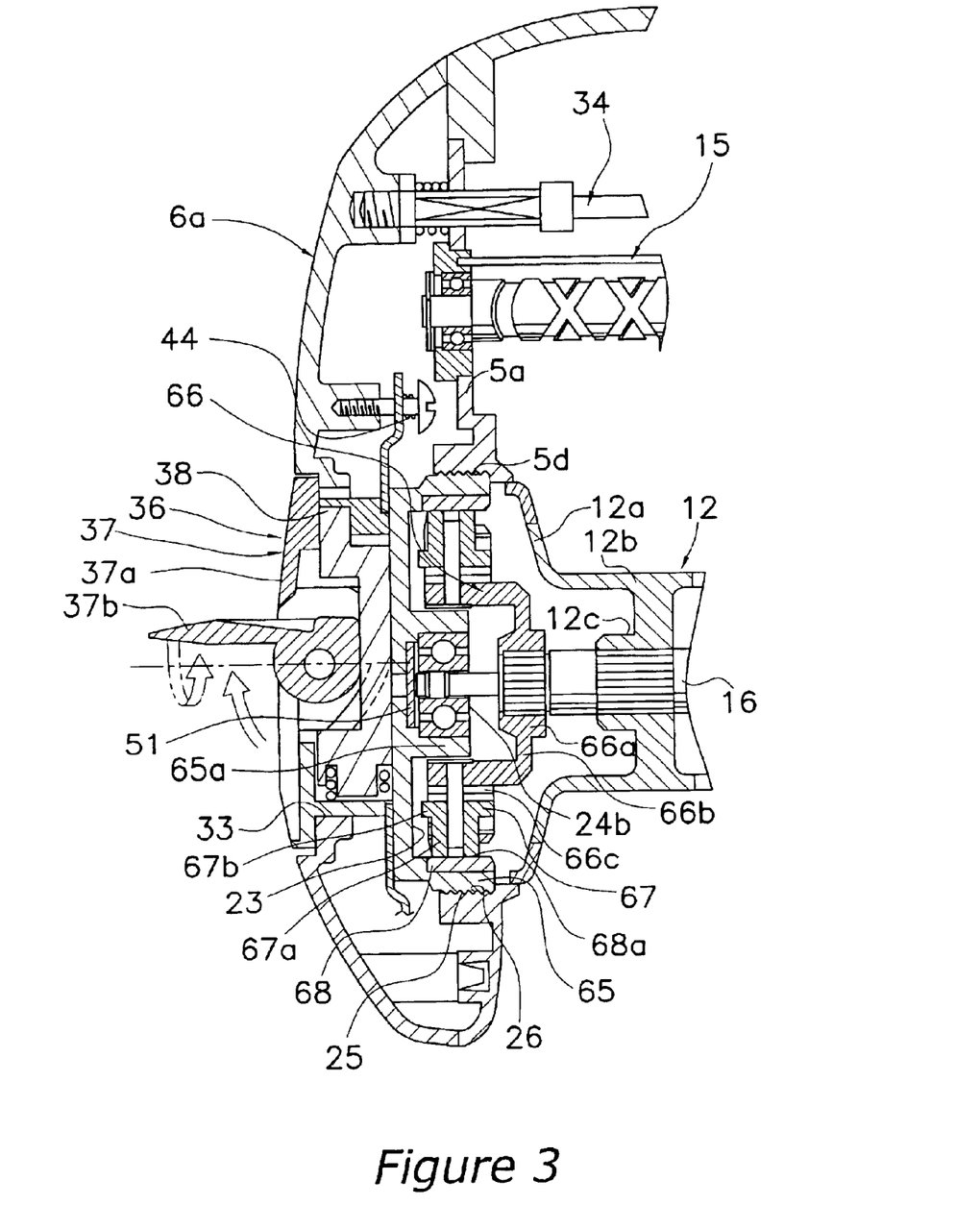
FIG. 3 is an enlarged cross-sectional view of a centrifugal braking mechanism of the dual-bearing reel shown in FIG. 2.

The first side cover 6a can be opened or closed with respect to the frame 5. Further, the first side cover 6a is mounted pivotally to the frame 5 to make it possible to attach and detach the spool 12. As shown in FIG. 2, the first side cover 6a includes a pivot mechanism 34, and a lock mechanism 36 for opening and closing the first side cover 6a. The pivot mechanism 34 pivotably supports the first side cover 6a on the frame 5, and also supports the first side cover 6a so that it can move away from the frame 5. The lock mechanism 36 serves to lock the first side cover 6a in the closed state and unlock the same therefrom. As shown in FIG. 3, the lock mechanism 36 includes an operation portion 37 that is mounted in an opening 33 formed in the first side cover 6a, and a lock member 38 that is mounted on the operation portion 37 such that it can be extended and withdrawn in the radial direction. The operation portion 37 includes an operation unit 37a that is both rotatively mounted in the opening 33 and movably mounted in the axial direction therein, and an operating knob 37b that is mounted such that it can pivot around an axis that extends in the radial direction of the operation unit 37a.

The operation unit 37a is an approximately tubular member, and is biased toward the first side cover 6a by a coil spring 44. The operation unit 37a is fixedly coupled to a closed-end tubular brake case 65 of a centrifugal brake mechanism (described below) by screws. The brake case 65 is removably mounted in an opening 5d for removing or installing the spool that is formed in a side plate 5a by way of a threaded structure.

As shown in FIG. 2, the spool 12, a level wind mechanism 15, and a clutch lever 17 are disposed inside the frame 5. The spool 12 is disposed perpendicular to a fishing rod. In other words, the axis of rotation for the spool 12 is preferably perpendicular to the fishing rod on which the reel is mounted. The level wind mechanism 15 is provided to wind uniformly fishing line around the spool 12. The clutch lever 17 is provided to allow a thumb of the operator to be placed thereon when thumbing the fishing line. The spool 12 can pass through the opening 5d of the side plate 5a. In addition, a gear mechanism 18, a clutch mechanism 13, a clutch engage/disengage mechanism 19, a drag mechanism 21, and a casting control mechanism 22 are disposed in the space between the frame 5 and the second side cover 6b. The gear mechanism 18 transmits rotational force from the handle 2 to the spool 12 and the level wind mechanism 15. The clutch engage/disengage mechanism 19 serves to engage and disengage the clutch mechanism 13 and control the same in response to the operation of the clutch lever 17. The casting control mechanism 22 serves to regulate the resistance that develops when the spool 12 rotates. In addition, a centrifugal braking mechanism 23 is provided to prevent backlash when casting. The centrifugal braking mechanism 23 is disposed between the frame 5 and the first side cover 6a.

Figure 5:
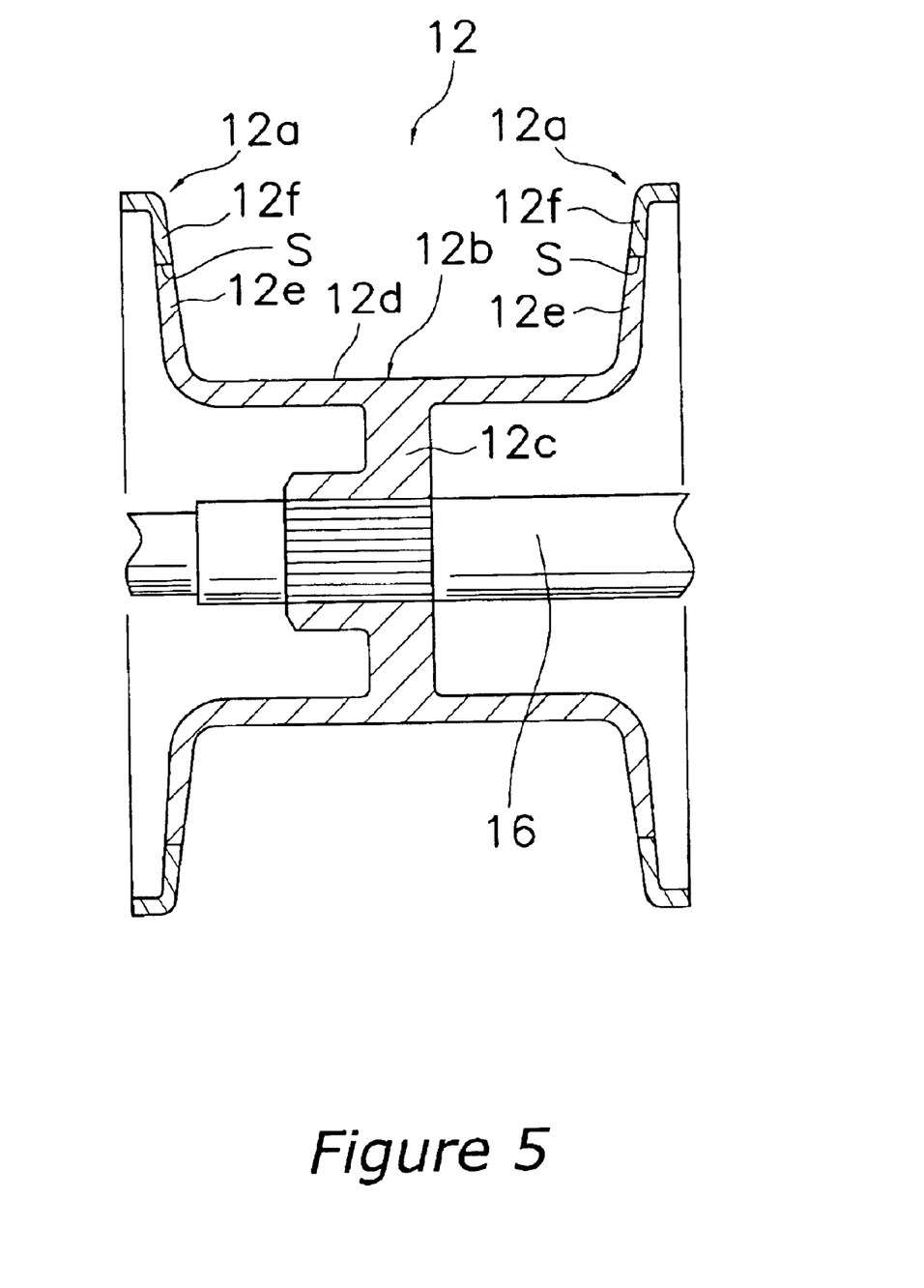
FIG. 5 is a magnified cross-sectional view of a spool of the dual-bearing reel.

As shown in FIG. 5, the spool 12 includes a tubular bobbin trunk 12b and flange portions 12a. The tubular bobbin trunk 12b is mounted on a spool shaft 16. Further, fishing line is wound around the outer periphery of the tubular bobbin trunk 12b. Each flange portion 12a is provided on each end of the bobbin trunk 12b and projects outward in the radial direction. The bobbin trunk 12b is preferably made from an aluminum alloy, and includes a boss portion 12c whose inner periphery thereof is unrotatably mounted on the spool shaft 16, and a tubular portion 12d that is integrally formed with the boss portion 12c and around the outer periphery of which fishing line is wound.

As shown in FIG. 5, the flange portions 12a include inner flange portions 12e on both ends of the tubular portion 12d and outer flange portions 12f on the outer peripheral surfaces of the inner flange portions 12e. Each inner flange portion 12e projects outward in the radial direction. The inner flange portions 12e are integrally formed with each other via the tubular portion 12d. The outer flange portions 12f project outward in the radial direction. The outer flange portions 12f are formed such that engagement surfaces S between the outer flange portions 12f and the inner flange portions 12e are circumferential surfaces. In other words, the engagement surfaces S are circumferentially level with respect to the axis of rotation of the spool. The outer flange portions 12f and the inner flange portions 12e are formed to be smoothly continuous. The outer flange portions 12f are formed from a magnesium alloy, and the density thereof is lower than that of the aluminum alloy bobbin trunk 12b. The outer flange portions 12f are outsert formed on the inner flange portions 12e.

As shown in FIG. 2, the spool shaft 16 passes through the side plate 5b and extends outward from the second side cover 6b. The end that extends outwardly from the second side cover 6b is rotatably supported by a bearing 24a in a boss 6c formed on the second side cover 6b. In addition, the other end of the spool shaft 16 is rotatably supported by a bearing 24b within the centrifugal braking mechanism 23. These bearings 24a and 24b are preferably sealed ball bearings.

The right end, i.e. the handle side, of a large diameter portion 16a of the spool shaft 16 is disposed at the position where the spool shaft 16 passes through the side plate 5b. Furthermore, an engagement pin 16b that forms a part of the clutch mechanism 13 is fixed onto the spool shaft 16 at this location. The large diameter portion 16a passes through the engagement pin 16b along the length thereof and radially projects radially from both sides thereof.

Referring to FIGS. 1 and 2, the gear mechanism 18 includes a handle shaft 30, a main gear 31 fixedly coupled to the handle shaft 30, and a tubular pinion gear 32 that meshes with the main gear 31. The vertical position of the handle shaft 30 of this gear mechanism 18 is lower than the conventional position in order to lower the height of the thumb rest 8. Thus, the lower portion of the side plate 5b and the second side cover 6b that accommodate the gear mechanism 18 is positioned below the lower portion of the side plate 5a and the first side cover 6a.

As shown in FIG. 2, the pinion gear 32 extends inward from the outside of the side plate 5b, is a tubular component which passes through the center of the spool 16, and is mounted to the spool shaft 16 such that it is moveable in the axial direction. In addition, the left end, i.e. the end opposite the handle 2 of the pinion gear 32 is rotatably and axially movably supported on the side plate 5b by a bearing 43. This bearing 43 is preferably also a sealed ball bearing.

The pinion gear 32 has gear teeth 32a, an engagement portion 32b, and a constricted portion 32c. The gear teeth 32a are formed on the outer peripheral portion of the right end of the pinion gear 32, i.e. the handle 2 side of the pinion gear 32. The gear teeth 32a mesh with the main gear 31. The engagement portion 32b is formed on the other end of the pinion gear 32. The constricted portion 32c is formed between the gear teeth 32a and the engagement portion 32b. The engagement portion 32b is made of a groove that is formed in the end surface of the pinion gear 32 along the diameter thereof. The engagement pin 16b through which the spool shaft 16 passes and is fixedly coupled is engaged with the engagement portion 32b. When the pinion gear 32 is moved outward, and the engagement portion 32b and the engagement pin 16b of the spool shaft 16 are uncoupled, the rotational force from the handle shaft 30 is not transmitted to the spool 12. The engagement portion 32b and the engagement pin 16b function as the clutch mechanism 13. When the engagement pin 16b and the engagement portion 32b are engaged, then torque is transmitted directly from the pinion gear 32, whose diameter is larger than that of the spool shaft 16, to the spool shaft 16, so that twisting deformations are reduced and the torque transmission efficiency is improved.

As shown in FIG. 2, the clutch lever 17 is disposed on rear end to the rear of the spool 12, and between the pair of side plates 5a and 5b.

As shown in FIG. 2, the clutch engage/disengage mechanism 19 includes a clutch yoke 40. The clutch yoke 40 is disposed on the outer peripheral side of the spool shaft 16, and is supported by two pins 41 (only one of which is shown in the figure) such that it can be moved parallel to the axis of the spool shaft 16. In addition, the clutch yoke 40 includes an engagement portion 40a on the central portion thereof that engages with the constricted portion 32c of the pinion gear 32. Moreover, springs 42 are disposed around the outer periphery of the pins 41 that support the clutch yoke 40, between the clutch yoke 40 and the second side cover 6b. The clutch yoke 40 is constantly biased inward by the springs 42.

With this configuration, in the ordinary state, the pinion gear 32 is positioned in an inward clutch-engaging position, in a clutch-on state in which the engagement portion 32b and the engagement pin 16b of the spool shaft 16 are engaged. On the other hand, when the pinion gear 32 is shifted outward by the clutch yoke 40, the engagement portion 32b and the engagement pin 16 are disengaged and assume a clutch-off state.

The drag mechanism 21 includes a friction plate 45 that is pressed against the main gear 31, and a pressure plate 46 for pressing the friction plate 45 against the main gear 31 with a predetermined amount of pressure when the star drag 3 is rotated.

The casting control mechanism 22 includes a plurality of friction plates 51 and a braking cap 52. The friction plates 51 are disposed on both ends of the spool shaft 16. The braking cap 52 is provided to adjust the force with which the friction plates 51 are pressed against the spool shaft 16. The left side friction plate 51 is mounted inside the brake case 65.

<Structure of the Centrifugal Braking Mechanism>

Figure 4:
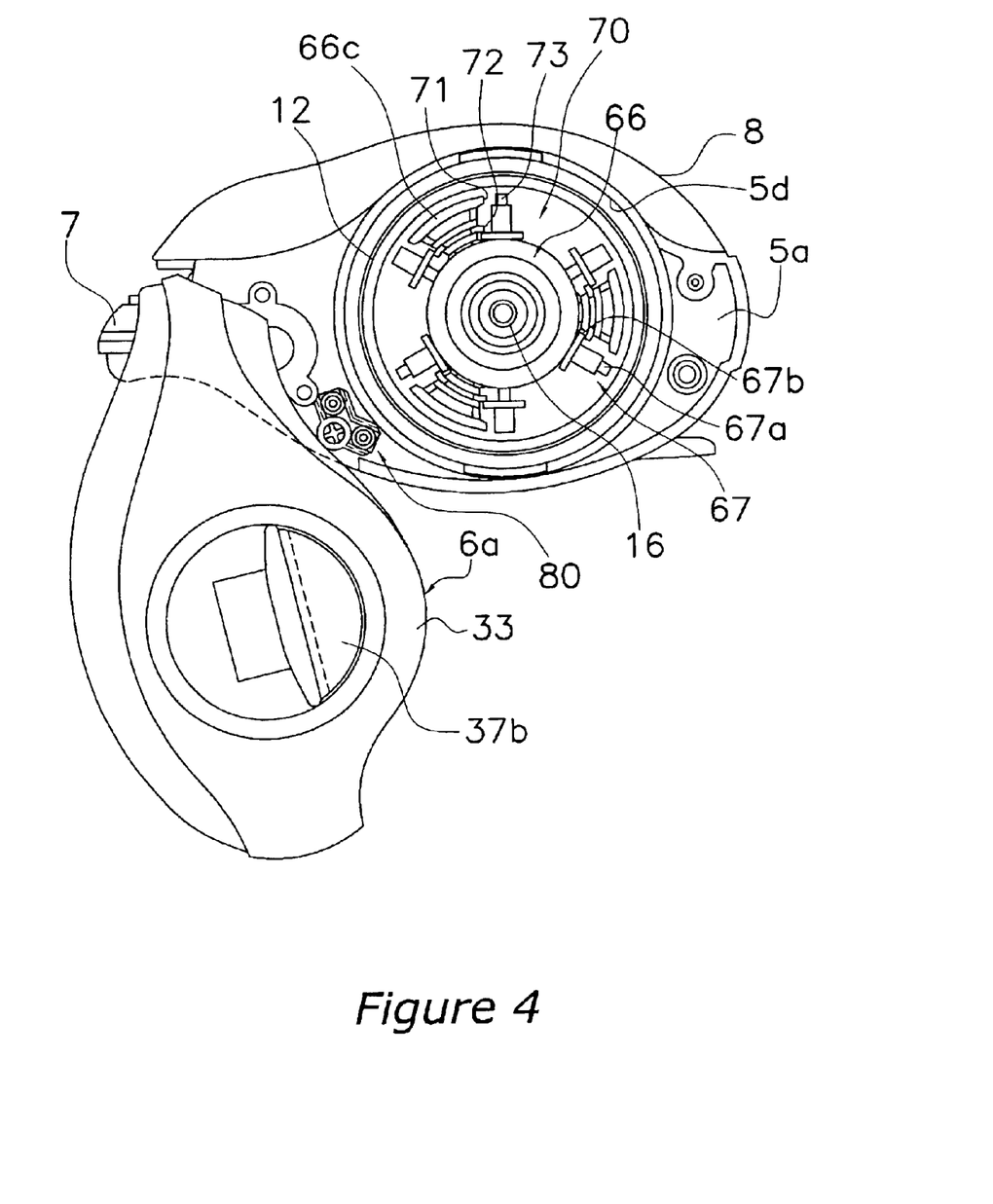
FIG. 4 is an elevational view of dual-bearing reel with a first side cover removed.
Figure 6:
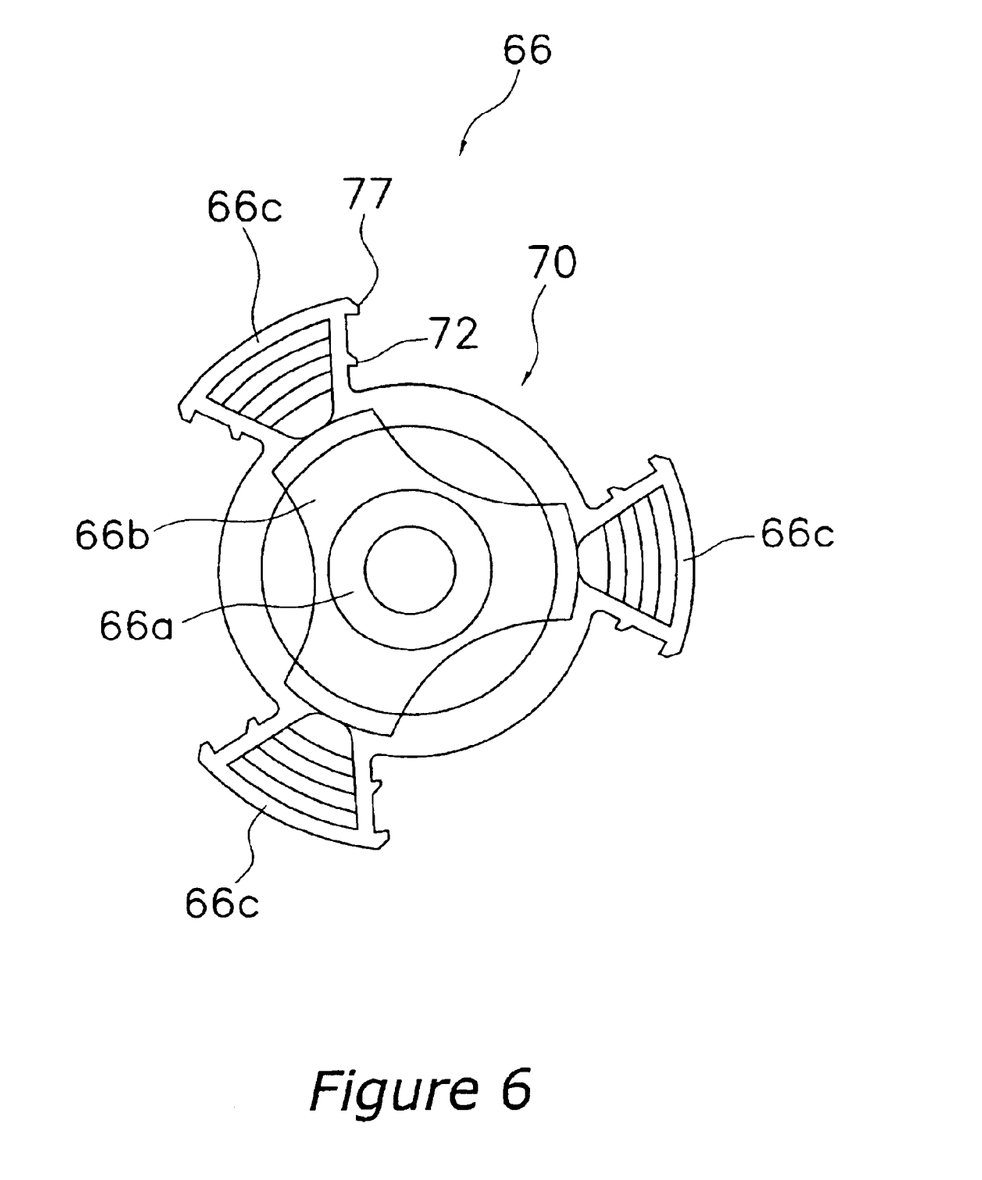
FIG. 6 is an enlarged elevational view of the centrifugal braking mechanism.
Figure 7:
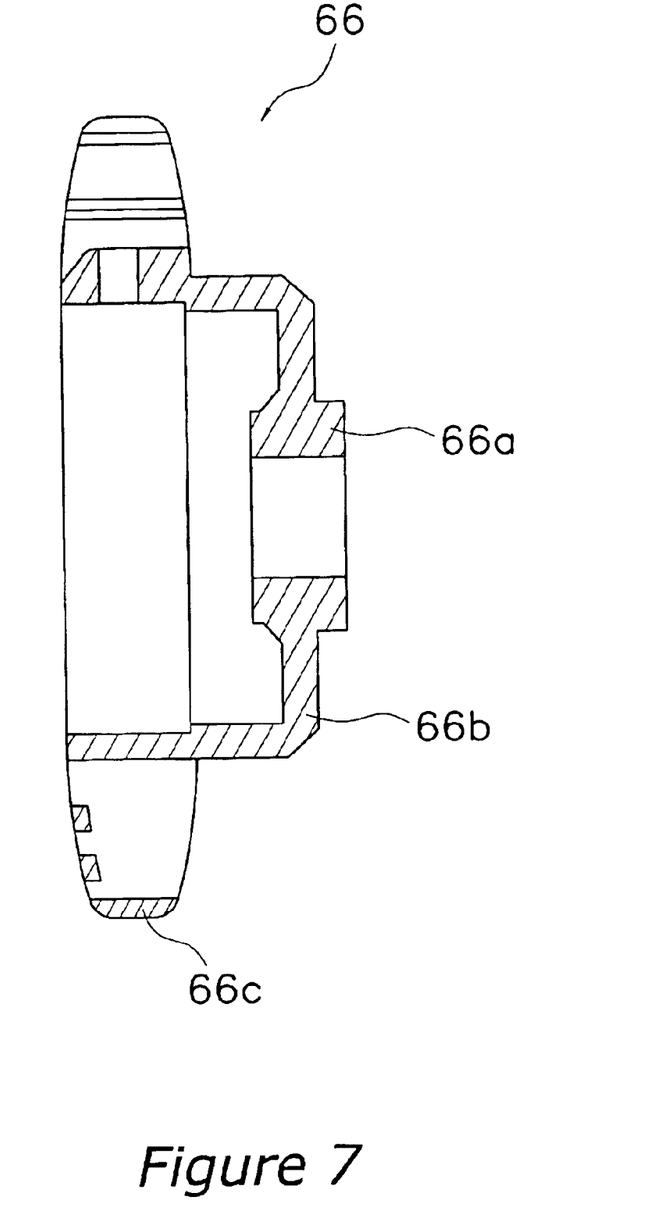
FIG. 7 is an enlarged cross-sectional view of the centrifugal braking mechanism.

As shown in FIGS. 3, 6, and 7, the centrifugal braking mechanism 23 is preferably made of a braking member 68, a rotating member 66, and moving members 67. The braking member 68 is fixedly coupled to the brake case 65. The rotating member 66 is concentrically disposed on an inner peripheral side of the braking member 68 and fixedly coupled to the spool shaft 16. The moving members 67 are mounted on the rotating member 66 so that they are radially movable therewith. As seen in FIG. 4, there are preferably six moving members 67.

Referring again to FIGS. 3, 6, and 7, the braking member 68 is a thin walled cylindrical member formed, for example, from a copper alloy, and is fixedly coupled to an inner peripheral surface of the brake case 65. The braking member 68 includes a cylindrical braking surface 68a on the inner surface thereof. The brake case 65 is a closed end tubular member, and a tubular bearing accommodating portion 65a that projects inward is formed inside the brake case 65 on the bottom thereof. The bearing 24b that supports the spool shaft 16 is disposed on the inner peripheral side of the bearing accommodating portion 65b, and the friction plate 51 of the casting control mechanism 22 is mounted to the bearing accommodating portion 65b.

The rotating member 66 includes a fixing portion 66a, a cylindrical portion 66b, and a projecting portion 66c. The fixing portion 66a is fixedly coupled to the spool shaft 16. The cylindrical portion 66b extends from the fixing portion 66a toward the outer peripheral side of the bearing accommodating portion 65a. As shown in FIGS. 6 and 7, the projecting portions 66c project radially in three directions from the outer peripheral surface of the cylindrical portion 66b. The projecting portions 66c are approximate fan shaped members that radially project outward in three directions from the outer peripheral surface of the cylindrical portion 66b. The inner portions of the projecting portions 66c are formed into a lattice shape made of three arcs in order to reduce weight. In addition, a pair of protrusions 71 and 72 that projects outward in the circumferential direction is formed on each wall surface of the projecting portions 66c, and serves to regulate the movement of the moving member 67.

As shown in FIG. 4, a concave portion 70 is formed between each projecting portion 66c. Each concave portion 70 accommodates two moving members 67, and is provided in order to switch between an operational state in which the moving members 67 can come into contact with the braking member 68 and a non-operational state in which there is no contact therebetween. In addition, guide shafts 73 for guiding the moving members 67 are disposed on the bottom of the concave portions 70 so as to extend outward in the radial direction.

The protrusions 71 are formed on the edge of the openings of the concave portions 70, and are provided in order to prevent the moving members 67 from slipping off the guide shafts 73. The protruding portions 72 are formed in positions closer to the bottom surface of the concave portions 70, and are provided in order to regulate the moving members 67 so that the moving members 67 do not come into contact with the braking member 68.

The moving members 67 are substantially cylindrical in shape and are preferably made from a synthetic resin. The moving members 67 are disposed such that they slide in the radial direction on the guide shaft 73 of the moving member 66, and come into contact with the braking member 68 due to centrifugal force generated by the rotation of the spool 12. The moving members 67 each have a cylindrical main unit 67a that is guided by the guide shaft 73, and a brim portion 67b integrally formed with an inner end portion of the main unit 67a. Each brim portion 67b is engaged with a pair of the protruding portions 71 and 72 formed on the concave portion 70, and projects outward in the radial direction from the inner end portion of the main unit 67b. A switching mechanism 69 is made of the brim portions 67a and the protruding portions 72.

When a brim portion 67b is disposed between a protruding portion 71 and a protruding portion 72, the brim portion 67b will engage with the protruding portion 71, which will prevent the moving member 67 from slipping off. However, it is possible for the moving members 67 to move into contact with the braking member 68, which is the operational state of the centrifugal braking mechanism 23. In addition, when the moving members 67 are pushed radially inward and are disposed radially inward of the protruding portions 72, the moving members 67 are engaged by the protruding members 72. Thus, the moving members 67 can no longer come into contact with the braking member 68.

This is the non-operational state of the centrifugal braking mechanism 23. Thus, the number of moving members 67 capable of coming into contact with the braking member 68 can be regulated by switching the moving members 67 between the operational state and the non-operational state.

<Adjustment of the Braking Force>

When the braking force is to be adjusted, the first side cover 6a is opened and the opening 5d in the side plate 5a is opened.

The first side cover 6a is opened by first pivoting the operating knob 37b from the locked state shown in FIG. 2 to the unlocked state shown in FIG. 3. Referring to FIGS. 3 and 4, when the operating knob 37b is to be placed in the unlocked state, the lock member 38 is pushed by the operating knob 37b, resists the biasing force of the coil spring 44, and moves to the unlocked position. When the lock member 38 moves to the unlocked position, the tip thereof is withdrawn from the convex portion of the opening 33, and the operation unit 37a is then able to rotate.

When the operating knob 37b is rotated in this state, the operation unit 37a rotates together with the brake case 65, and the brake case 65 and the side plate 5a become disengaged from each other. When the brake case 65 and the side plate 5a become disengaged from each other, the brake case 65 moves outward together with the operation unit 37a by way of the coil spring 44. Simultaneously therewith, the first side cover 6a moves away from the side plate 5a by way of the pivot mechanism 34. When the brake case 65 is completely separated from the outside surface of the side plate 5a, the first side cover 6a is separated from the reel unit 1 and pivots to the open position shown in FIG. 4 by way of its own weight by pivoting around the pivot mechanism 34.

Referring to FIGS. 3 and 4, when the braking force is to be adjusted, the moving members 67 are moved along the direction of the guide shafts 73, and are switched to either the operational state or the non-operational state. When the adjustment of the braking force has been completed, the first side cover 6a is closed. When this occurs, the first side cover 6a is pivoted by hand to the closed state, and then the operating knob 37b is pushed to insert the brake case 65 into the opening 5d. The operating knob 37b is then rotated in the direction opposite to the unlock direction with the tip of the brake case 65 being in contact with the opening 5d. When this occurs, the brake case 65 is engaged with the opening 5d. Then, the operating knob 37b is pivoted from the unlocked position to the locked position, and the lock member 38 is engaged with the opening 33. Thus, the first side cover 6a is secured in the closed state.

In addition, the braking force can be further adjusted by removing moving members 67 from the guide shafts 73 and thereby adjusting the number of moving members 67. For example, when three moving members 67 are removed, the braking force will be half that of when there are six moving members 67. As shown in FIG. 4, a holder member 80 is provided to store the removed moving members 67. The holder member 80 is mounted on the side plate 5a below and in front of the spool 12.

Figure 8:
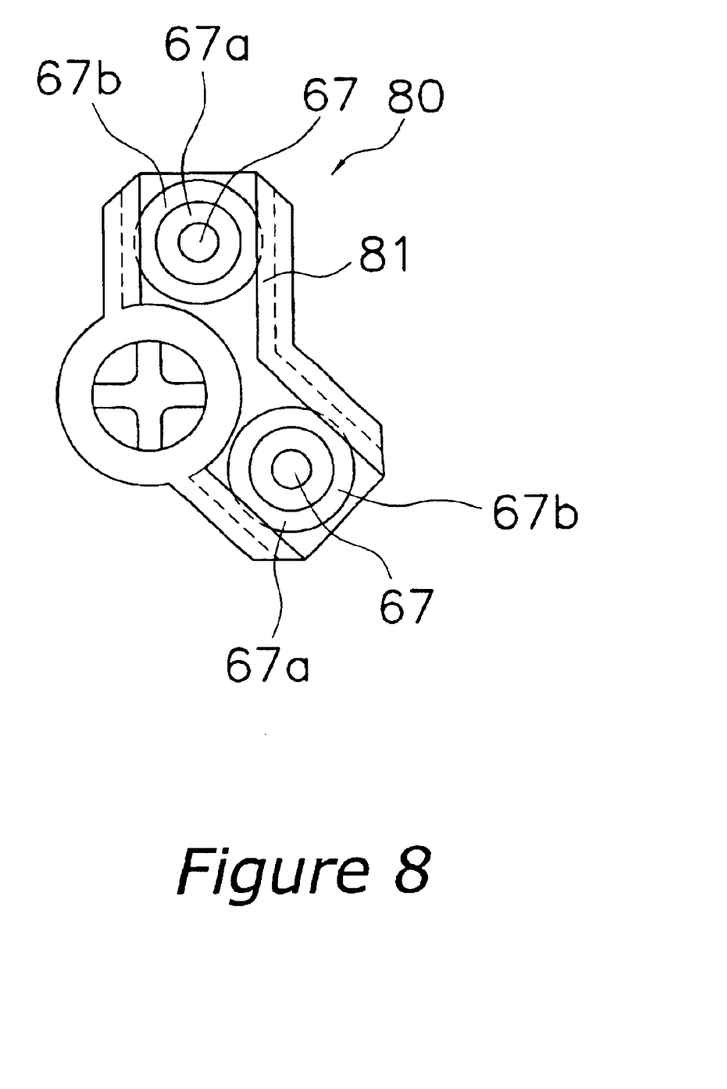
FIG. 8 is an enlarged cross-sectional view of a holder member for the centrifugal braking mechanism.

As shown in FIG. 8, the holder member 80 is preferably a synthetic resin member that is curved into an approximate L-shape, and includes a groove 81 that engages with the brim portions 67b of the moving members 67. Two moving members 67 can be stored in this holder member 80 from both ends of the groove 81. This holder member 80 can prevent the moving members 67 that are removed from the guide shafts 73 from being lost.

As seen in FIG. 5, in a dual-bearing reel constructed in this manner, the spool 12 includes an aluminum alloy bobbin trunk 12b, and flange portions 12a that project radially outward on both sides of the bobbin trunk 12b. The flange portions 12a include inner flange portions 12e, and outer flange portions 12f that are provided on the outer periphery of the inner flange portions 12e and which are preferably formed from a magnesium alloy. The magnesium alloy outer flange portions 12f easily assert an influence on the inertial force of the spool 12 when it rotates because the density thereof are lower than that of the aluminum alloy bobbin trunk 12b, and thus the weight of the outer flange portions 12f can be reduced. Thus, since the weight of the outer flange portions 12f is reduced, the initial rotational speed of the spool will be quicker and a light tackle can be accurately cast.

ALTERNATE EMBODIMENTS

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

Figure 9:
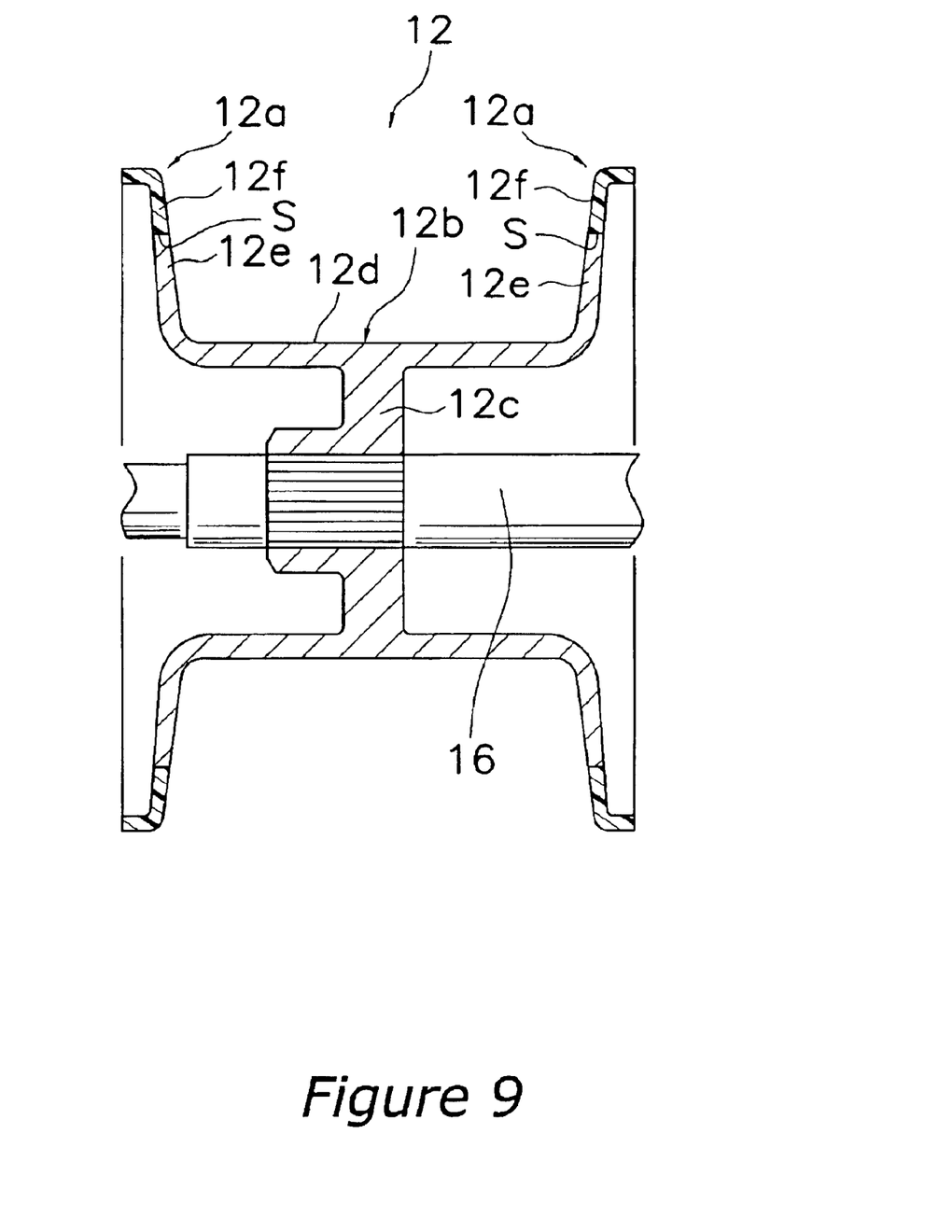
FIG. 9 is a magnified cross-sectional view of a spool of the dual-bearing reel corresponding to FIG. 5 in accordance with a first alternate embodiment of the present invention.

(a) In the aforementioned embodiment, the outer flange portions 12f are made of a magnesium alloy, however the present invention is not limited thereto. The outer flange portions 12 may be formed from any material having a density that is lower than that of the aluminum alloy bobbin trunk 12b. For example, as shown in FIG. 9, the outer flange portions 12f may be formed from a synthetic resin.

Figure 10:
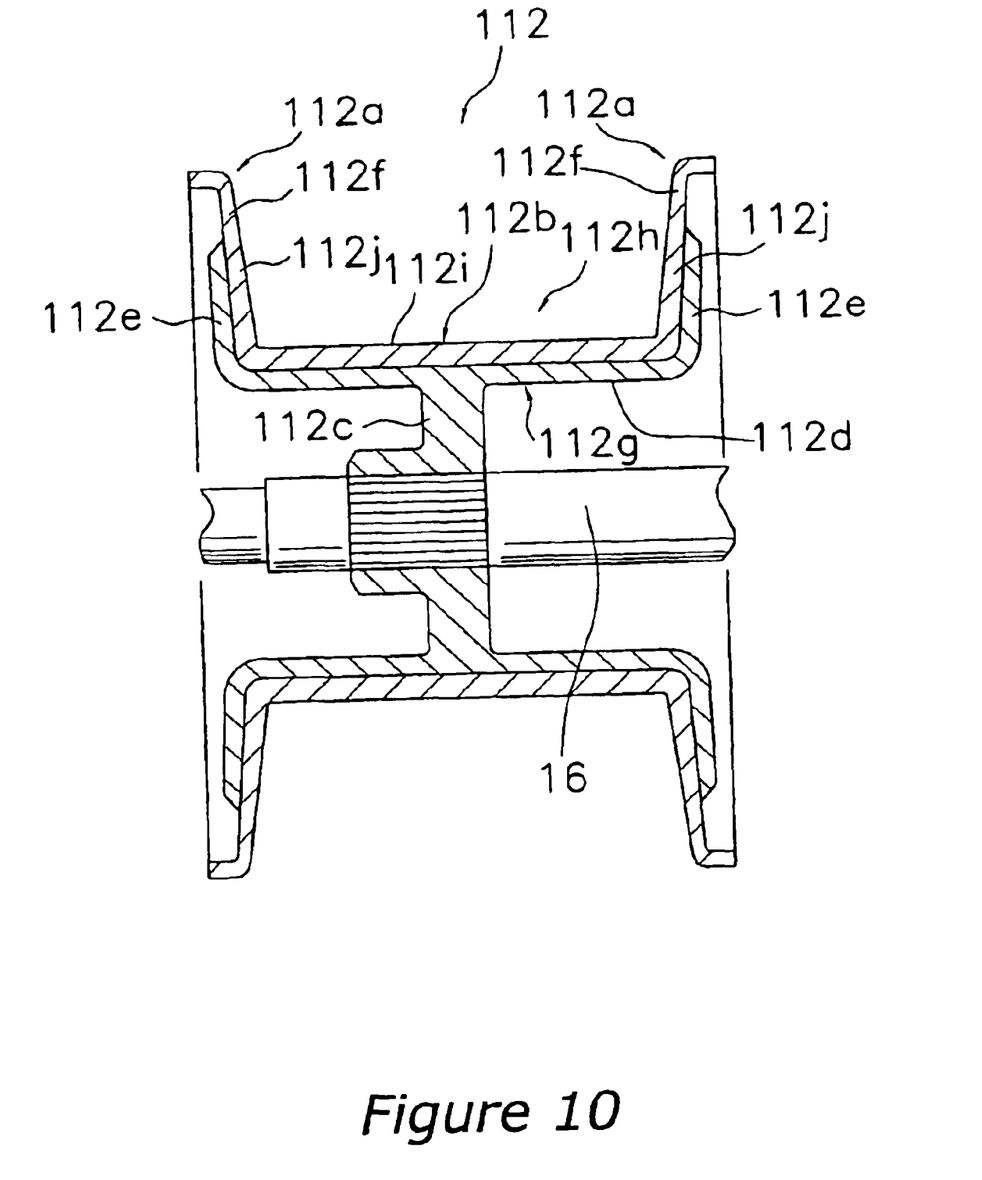
FIG. 10 is a magnified cross-sectional view of a spool of the dual-bearing reel corresponding to FIG. 5 in accordance to a second alternate embodiment of the present invention.

(b) As shown in FIG. 10, the bobbin trunk 112b may be made of an inner peripheral portion 112g of which the inner periphery is mounted on the spool shaft 16, and an outer peripheral portion 112h around whose outer periphery fishing line is wound. The inner peripheral portion 112g includes a boss portion 112c, a tubular portion 112d, and inner flange portions 112e. An inner periphery of the boss portion 112c is mounted on the spool shaft 16. The tubular portion 112d is integrally formed with the boss portion 112c. The inner flange portions 112e each project radially outward from both ends of the tubular portion 112d and are integrally formed therewith. The outer peripheral portion 112h includes a cylindrical portion 112i, a plurality of rise portions 112j, and a plurality of outer flange portions 112f. The cylindrical portion 112i is provided around the outer periphery of the cylindrical portion 112d. Each of the rise portions 112j project radially outward on both ends of the cylindrical portion 112i and are integrally formed on opposing surfaces of the inner flange portions 112e. The outer flange portions 112f are integrally provided on the outer periphery of the rise portions 112j. Here, the strength of the bobbin trunk 112b can be increased by way of the inner peripheral portions 112g and the outer peripheral portion 112h.

Figure 11:
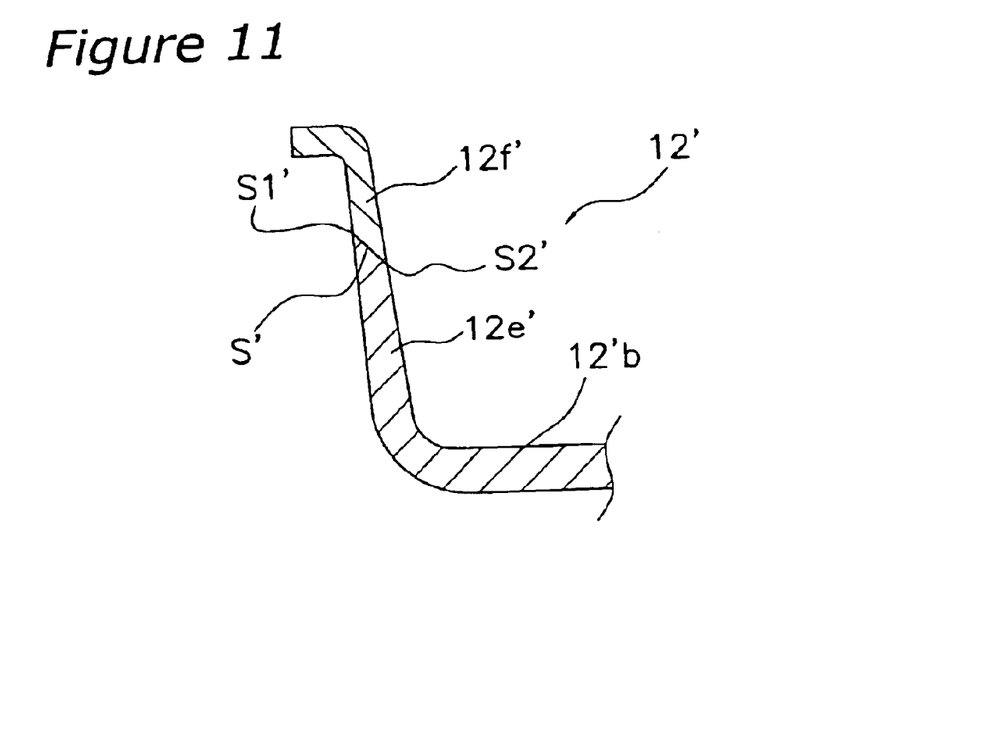
FIG. 11 is an enlarged cross-sectional view of a flange of a spool in accordance with a third alternate embodiment of the present invention.

(c) In the aforementioned first embodiment, the outer flange portions 12f are formed such that engagement surfaces S between the outer flange portions 12f and the inner flange portions 12e are circumferential surfaces. However, the present invention is not limited thereto. As shown in FIG. 11, the engagement surface S' between the outer flange portion 12f' and the inner flange portion 12e' may be a tapered surface that are slanted with a flange-side end S1' of the engagement surface S' being radially farther away from the bobbin trunk 12b' than its bobbin-trunk-side end S2'. In this situation, even if a strong force is applied from the bobbin trunk 12b' to the outer flange portions by the fishing line, deformation of the outer flange portions 12f' can be suppressed by supporting the outer flange portions 12f' with tapered surfaces.

Figure 12:
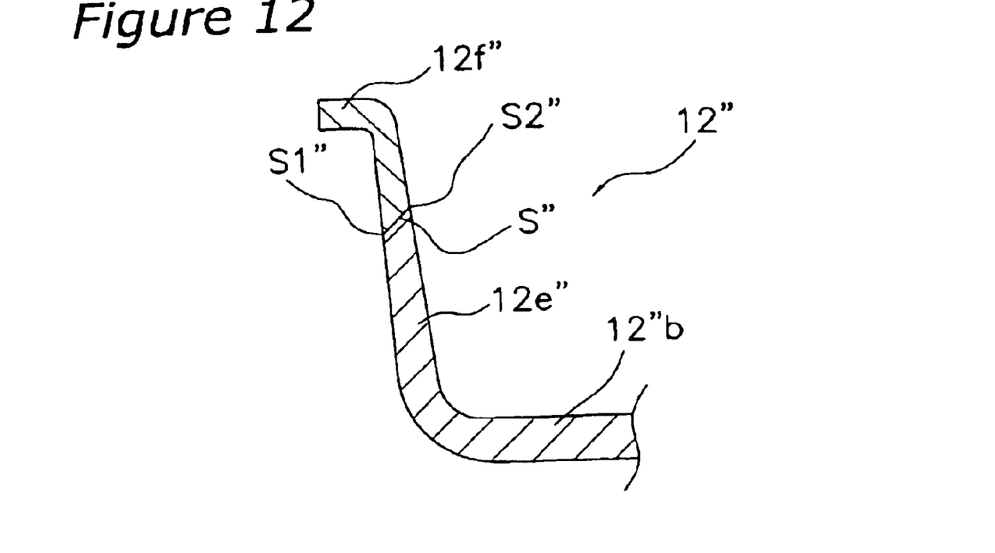
FIG. 12 is an enlarged cross-sectional view of a flange of a spool in accordance with a fourth alternate embodiment of the present invention corresponding to FIG. 11.
Figure 13:
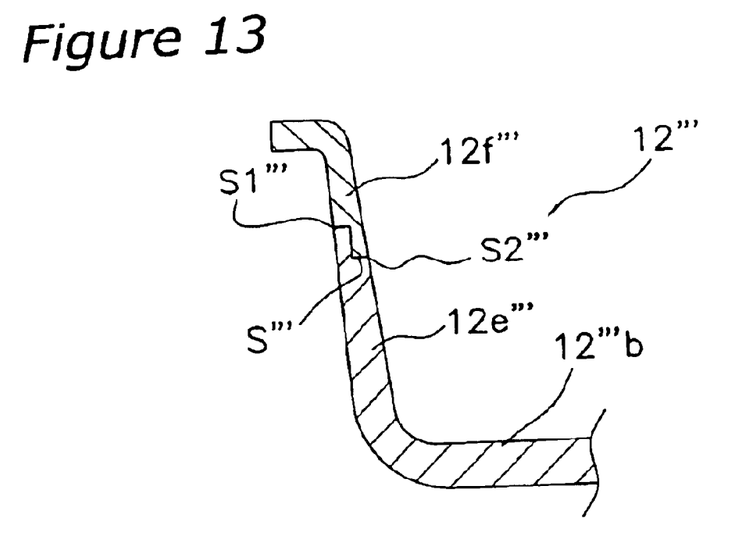
FIG. 13 is an enlarged cross-sectional view of a flange of a spool in accordance with a fifth alternate embodiment of the present invention corresponding to FIG. 11.
Figure 14:
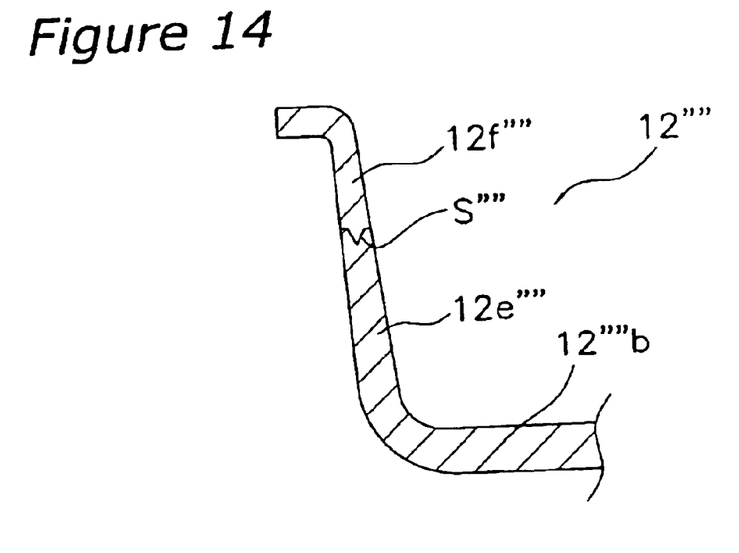
FIG. 14 is an enlarged cross-sectional view of a flange of a spool in accordance with a sixth alternate embodiment of the present invention corresponding to FIG. 11.

In addition, as shown in FIG. 12, the engagement surface S" between the outer flange portion 12f" and the inner flange portion 12e" may be an oppositely tapered surface, with the bobbin-trunk-side end S2" of the engagement surface S" being radially farther away from the bobbin trunk 12b" than its flange-side end S1". In this situation, the outer flange portions 12f can be easily installed on both ends of the flange by, for example, using an adhesive or the like. Furthermore, as shown in FIGS. 13 and 14, the engagement surfaces S''' or S'''' between the outer flange portion 12f''' or 12f'''' and the inner flange portion 12e''' or 12e'''' may have a stepped shape or a V-shape, respectively, when viewed in cross-section. Furthermore, in the structure of FIG. 13, the engagement surface S''' between the outer flange portion 12f''' and the inner flange portion 12e''' is a stepped surface with a flange-side end S1''' of the engagement surface S''' being radially farther away from the bobbin trunk 12b''' than its bobbin-trunk-side end S2'''. In this situation, the engagement between the outer flange portions 12f''' or 12f'''' and the inner flange portion 12e''' or 12e'''' will be comparatively strong. Furthermore in the structure of FIG. 13, deformation of the outer flange portions 12f''' can be suppressed by supporting the outer flange portions 12f''' with the stepped surface.

According to the present invention, a light tackle can be accurately cast with a dual-bearing reel because the outer flange portions of the spool thereof are formed from a material having a density that is lower than that of the material used for the bobbin trunk.

"Means plus function" clauses as utilized in the specification and claims should include any structure or hardware and/or algorithm or software that can be utilized to carry out the function of the "means plus function" clause.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-311548. The entire disclosure of Japanese Patent Application No. 2002-311548 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spool for a dual-bearing reel that has a reel unit, a handle mounted on the reel unit, and a spool shaft supported by the reel unit, said spool being adapted to be provided on the spool shaft so as to be rotatable by rotation of the handle and comprising:

a tubular bobbin trunk being adapted to be mounted to the spool shaft, a fishing line being adapted to be wound around an outer periphery of said trunk portion; and flange portions provided at ends of said bobbing trunk, at least one of said flange portions including, an inner flange portion projecting radially outward from one of said ends of said bobbin trunk, and an outer flange portion projecting radially outward from an outer periphery of said inner flange portion, said outer flange portion having a density lower than that of said bobbin trunk, an engagement surface of said outer flange portion, where said inner flange portion engages said outer flange portion, having a flange-side end and a bobbin-trunk side end, said flange-side end being radially farther away from said bobbin trunk than said bobbin-trunk side end is.

2. The spool for the dual-bearing reel according to claim 1, wherein said outer flange portion is made from a magnesium alloy.

3. The spool for the dual-bearing reel according to claim 1, wherein said outer flange portion is made from a synthetic resin.

4. The spool for the dual-bearing reel according to claim 1, wherein said bobbin trunk is made from an aluminum alloy.

5. The spool for the dual-bearing reel according to claim 1, wherein said bobbin trunk is integrally formed with said inner flange portion, and said outer flange portion is provided on an outer peripheral surface of said inner flange portion.

6. The spool for the dual-bearing reel set forth in claim 5, wherein said outer flange portion is outsert fanned on said inner flange portion.

7. The spool for the dual-bearing reel according to claim 1, wherein said inner and outer flange portions engage each other at their engagement surfaces, and said engagement surfaces are tapered surfaces whose flange side end is radially farther away from said bobbin trunk than its bobbin trunk side end.

8. The spool for the dual-bearing reel according to claim 1, wherein said inner and outer flange portions engage each other at their engagement surfaces, and said engagement surfaces have a stepped shape.

9. A spool for the dual-bearing reel that has a reel unit, a handle mounted on the reel unit, and a spool shaft supported by the reel unit, said spool being adapted to be provided on the spool shaft so as to be rotatable by rotation of the handle and comprising:

a tubular bobbin trunk being adapted to be mounted to the spool shaft, a fishing line being adapted to be wound around an outer periphery of said trunk portion; and flange portions provided at ends of said bobbing trunk, at least one of said flange portions including, an inner flange portion projecting radially outward from one of said ends of said bobbin trunk, and an outer flange portion projecting radially outward from an outer periphery of said inner flange portion, said outer flange portion having a density lower than that of said bobbin trunk, wherein said outer flange portion is made from a magnesium alloy, said inner and outer flange portions engage each other at their engagement surfaces, and said engagement surfaces have a V-shape.

10. A dual-bearing reel comprising:

a reel unit;

a handle being rotatably attached to said reel unit;

a spool shaft being rotatably supported by said reel unit; and a spool, being configured to be rotated by said handle, said spool having, a tubular bobbin trunk being adapted to be mounted to the spool shaft, a fishing line being adapted to be wound around an outer periphery of said trunk portion; and flange portions provided at ends of said bobbing trunk, at least one of said flange portions including, an inner flange portion projecting radially outward from one of said ends of said bobbin trunk, and an outer flange portion projecting radially outward from an outer periphery of said inner flange portion, said outer flange portion having a density lower than that of said bobbin trunk, an engagement surface of said outer flange portion, where said inner flange portion engages said outer flange portion, having a flange-side end and a bobbin-trunk side end, said flange-side end being radially farther away from said bobbin trunk than said bobbin-trunk side end is.

11. The dual-bearing reel according to claim 10, wherein said outer flange portion is made from a magnesium alloy.

12. The dual-bearing reel according to claim 10, wherein said outer flange portion is made from a synthetic resin.

13. The dual-bearing reel according to claim 10, wherein said bobbin trunk is made from an aluminum alloy.

14. The dual-bearing reel according to claim 10, wherein said bobbin trunk is integrally formed with said inner flange portion, and said outer flange portion is provided on an outer peripheral surface of said inner flange portion.

15. The dual-bearing reel according to claim 14, wherein said outer flange portion is outsert formed on said inner flange portion.

16. The dual-bearing reel according to claim 10, wherein said inner and outer flange portions engage each other at their engagement surfaces, and said engagement surfaces are tapered surfaces whose flange side end is radially farther away from said bobbin trunk than its bobbin trunk side end.

17. The dual-bearing reel according to claim 10, wherein said inner and outer flange portions engage each other at their engagement surfaces, and said engagement surfaces have a stepped shape.

* * * * *